(12) United States Patent
Wang et al.

(10) Patent No.: US 11,656,366 B2
(45) Date of Patent: May 23, 2023

(54) APPARATUS, SYSTEM AND METHOD FOR GENERALIZED MULTI-MODE STATE MACHINE BASED LOCALIZATION ENGINE AND APPLICATION OF SAME

(71) Applicant: Guangzhou Xiaopeng Autopilot Technology Co., Ltd., Guangdong (CN)

(72) Inventors: Pengluo Wang, San Diego, CA (US); Hairuo Zhuang, San Diego, CA (US); Amit Bansal, San Diego, CA (US); Xue Li, San Diego, CA (US); Venkatesan Nallampatti Ekambaram, San Diego, CA (US); Vignesh Sethuraman, San Diego, CA (US)

(73) Assignee: GUANGZHOU XIAOPENG AUTOPILOT TECHNOLOGY CO., LTD., Guangdong (CN)

(*) Notice: Subject to any disclaimer, the term of this patent is extended or adjusted under 35 U.S.C. 154(b) by 142 days.

(21) Appl. No.: 17/363,360

(22) Filed: Jun. 30, 2021

(65) Prior Publication Data
US 2023/0003904 A1   Jan. 5, 2023

(51) Int. Cl.
*G01S 19/47* (2010.01)
*G01S 19/49* (2010.01)
*G01S 19/39* (2010.01)

(52) U.S. Cl.
CPC ............ *G01S 19/396* (2019.08); *G01S 19/47* (2013.01); *G01S 19/49* (2013.01)

(58) Field of Classification Search
CPC ......... G01S 19/396; G01S 19/47; G01S 19/49
USPC ...................................... 342/357.3
See application file for complete search history.

(56) References Cited

U.S. PATENT DOCUMENTS 11,552,698 B2 *   1/2023   Myers ................... H04W 72/52
2020/0364187 A1 * 11/2020   Tran ...................... H04B 7/0413

* cited by examiner

*Primary Examiner* — Harry K Liu
(74) *Attorney, Agent, or Firm* — Locke Lord LLP; Tim Tingkang Xia, Esq.

(57) ABSTRACT

An apparatus and a method for performing positioning using a Global Navigation Satellite System (GNSS) with a state machine based localization engine are provided. When the apparatus receives GNSS signals, the apparatus provides the localization engine to process the GNSS signals, and determines, based on a GNSS status and a position-velocity-time (PVT) status, a state of the localization engine. Specifically, the state of the localization engine is switchable between at least 3 states, including a dead reckoning state, a tightly coupling state, and a loosely coupling state. Once the state is determined, the localization engine may determine a local accuracy status based on the state of the localization engine. Thus, a downstream module on the apparatus may use the local accuracy status to perform a corresponding downstream action.

17 Claims, 7 Drawing Sheets

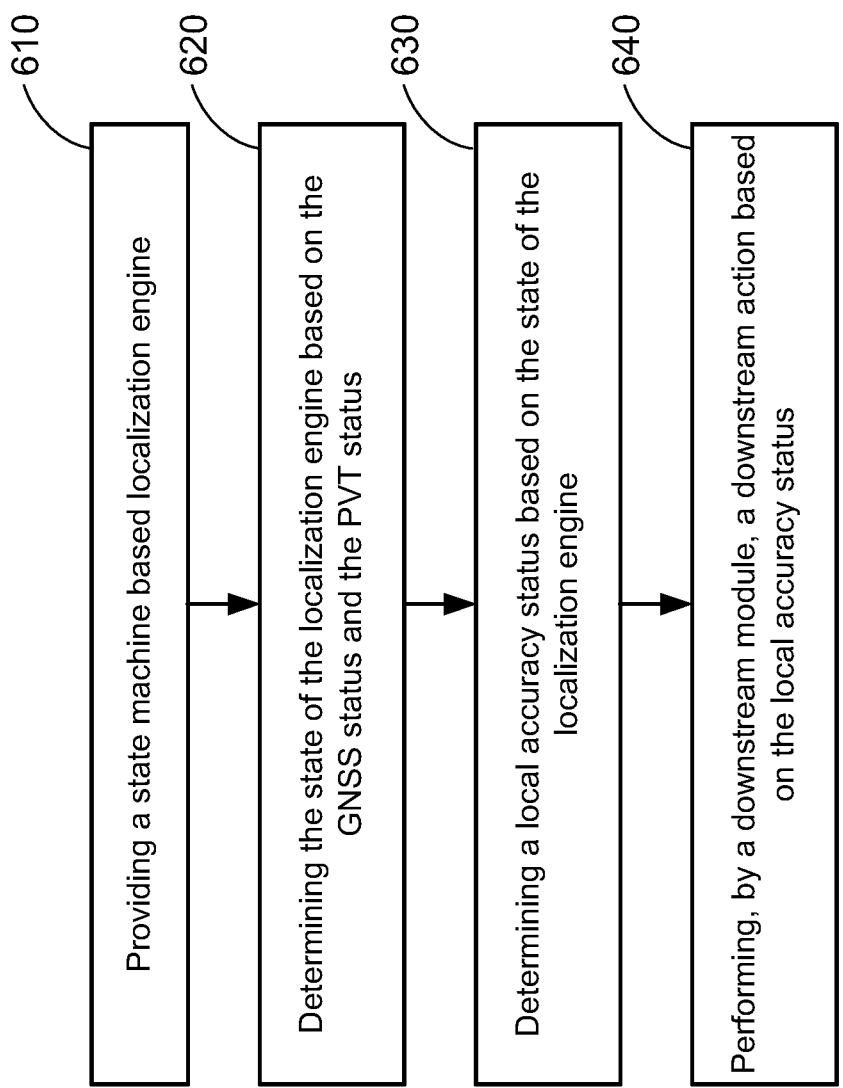

APPARATUS, SYSTEM AND METHOD FOR GENERALIZED MULTI-MODE STATE MACHINE BASED LOCALIZATION ENGINE AND APPLICATION OF SAME

FIELD OF THE INVENTION

The present invention relates generally to satellite navigation technology, and more particularly to an apparatus, system and method for performing positioning using a Global Navigation Satellite System (GNSS) with a state machine based localization engine, and applications of the same.

BACKGROUND OF THE INVENTION

The background description provided herein is for the purpose of generally presenting the context of the present invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

The Global Navigation Satellite System (GNSS) is an essential part for obtaining accurate global position. In some cases, a user may use an electronic receiver with a localization engine thereon, such as an extended Kalman filter (EKF) engine, to receive signals from GNSS to perform geo-spatial positioning with high precision. However, GNSS can be of low quality when the signal is blocked by tunnels, bridges, buildings, and even trees. Further, downstream modules on the electronic receiver may theoretically use the covariance output of the localization engine to determine the quality of localization and take appropriate actions. In some cases, however, the covariance matrix may not reflect the true quality of the solution.

Therefore, a heretofore unaddressed need exists in the art to address the aforementioned deficiencies and inadequacies.

SUMMARY OF THE INVENTION

The present invention relates to an apparatus, system and method for performing positioning using a Global Navigation Satellite System (GNSS) with a generalized multi-mode state machine based localization engine, and application of the same. Specifically, the apparatus provides a state machine based localization engine switchable between multiple states and local accuracy statuses, in order to control different behaviors of EKF based on the quality of raw GNSS observations and PVT solution given by on-board chip.

In one aspect of the invention, an apparatus for performing positioning using a Global Navigation Satellite System (GNSS) with a state machine based localization engine is provided. In certain embodiments, the apparatus includes: a receiving device communicatively connected to the GNSS, configured to receive GNSS signals from the GNSS; and a computing device having a processor and a storage device storing computer executable instructions. The computer executable instructions, when executed on the processor, cause the processor to: provide the localization engine to process the GNSS signals; determine, based on a GNSS status and a position-velocity-time (PVT) status, a state of the localization engine, wherein the state of the localization engine is switchable between at least 3 states, and the at least 3 states include a dead reckoning state, a tightly coupling state, and a loosely coupling state; determine, by the localization engine, a local accuracy status based on the state of the localization engine; and perform, by a downstream module, a downstream action based on the local accuracy status.

Another aspect of the invention relates to a method for performing positioning using a Global Navigation Satellite System (GNSS) with a state machine based localization engine. In certain embodiments, the method includes: receiving, by an apparatus communicatively connected to the GNSS, GNSS signals from the GNSS; providing the localization engine on the apparatus to process the GNSS signals; determining, based on a GNSS status and a position-velocity-time (PVT) status, a state of the localization engine, wherein the state of the localization engine is switchable between at least 3 states, and the at least 3 states include a dead reckoning state, a tightly coupling state, and a loosely coupling state; determining, by the localization engine, a local accuracy status based on the state of the localization engine; and performing, by a downstream module executed on the apparatus, a downstream action based on the local accuracy status.

In one embodiment, the GNSS status indicates, based on a quantity of inliers in the GNSS, whether there is valid GNSS observation or good GNSS observation; and the PVT status indicates, based on PVT accuracy values, whether there is valid PVT observation or good PVT observation.

In one embodiment, the GNSS status indicates valid GNSS observation when the quantity of the inliers in the GNSS is greater than or equal to 2, and indicates good GNSS observation when the quantity of the inliers in the GNSS is greater than or equal to 7; and the PVT status indicates valid PVT observation when a horizontal accuracy value is less than 0.5, and indicates good PVT observation when the horizontal accuracy value is less than 0.2.

In one embodiment, the localization engine is switched to the dead reckoning state in response to determine that there is no valid GNSS observation for a predetermined time period; the localization engine is switched to the loosely coupling state in response to determine that there is good GNSS observation; and the localization engine is switched to the tightly coupling state in response to determine that there is valid PVT observation but no good GNSS observation for the predetermined time period.

In one embodiment, the predetermined time period is 5 seconds.

In one embodiment, the local accuracy status is switchable between a dead reckoning mode, a GNSS based localization mode and a PVT based localization mode.

In one embodiment, the local accuracy status is switched to the dead reckoning mode when a last GNSS update time is greater than 1 second; the local accuracy status is switched to the GNSS based localization mode when the last GNSS update time is less than 1 second; and the local accuracy status is switched to the PVT based localization mode when: (1) the last GNSS update time is less than 1 second, the state of the localization engine is in the loosely coupling state, and the localization engine passes a PVT innovation test; or (2) the local accuracy status is in the GNSS based localization mode for 5 second, and the localization engine passes the PVT innovation test.

In one embodiment, the downstream module is a map fusion module.

Another aspect of the invention relates to a vehicle having the apparatus as described above.

A further aspect of the invention relates to a non-transitory tangible computer-readable medium storing computer executable instructions which, when executed by one or more processors, cause the method as described above to be performed.

These and other aspects of the present invention will become apparent from the following description of the preferred embodiments, taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. The same reference numbers may be used throughout the drawings to refer to the same or like elements in the embodiments.

FIG. 6 shows a flowchart of a method for performing positioning using the GNSS with a state machine based localization engine according to one embodiment of the invention.

DETAILED DESCRIPTION OF THE INVENTION

Figure 1:
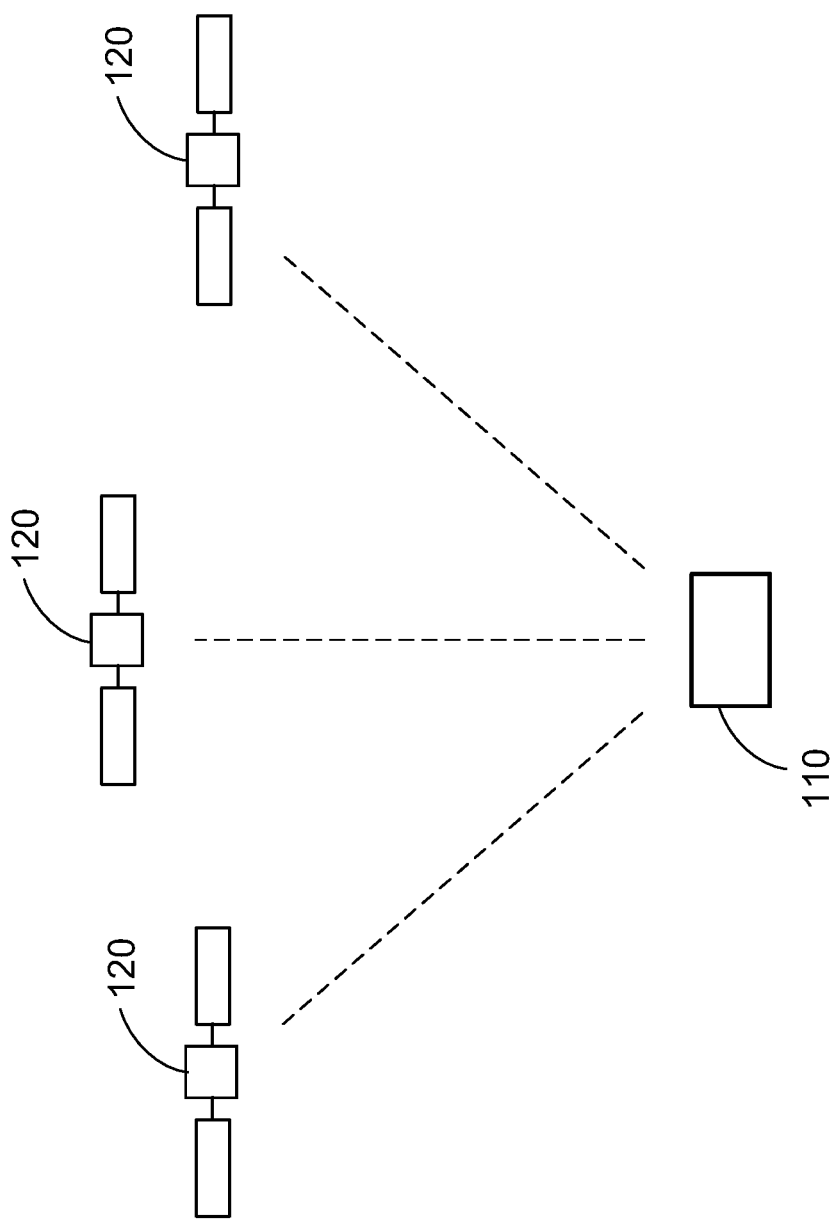
FIG. 1 shows schematically an overall architecture of a Global Navigation Satellite System (GNSS) according to one embodiment of the invention.

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this invention will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that, as used in the description herein and throughout the claims that follow, the meaning of "a", "an", and "the" includes plural reference unless the context clearly dictates otherwise. Also, it will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Furthermore, relative terms, such as "lower" or "bottom" and "upper" or "top," may be used herein to describe one element's relationship to another element as illustrated in the figures. It will be understood that relative terms are intended to encompass different orientations of the device in addition to the orientation depicted in the figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

It will be further understood that the terms "comprises" and/or "comprising," or "includes" and/or "including" or "has" and/or "having", or "carry" and/or "carrying," or "contain" and/or "containing," or "involve" and/or "involving, and the like are to be open-ended, i.e., to mean including but not limited to. When used in this invention, they specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present invention, and will not be interpreted in an idealized or overly formal sense unless expressly so defined herein.

As used herein, the phrase at least one of A, B, and C should be construed to mean a logical (A or B or C), using a non-exclusive logical OR. As used herein, the term "and/or" includes any and all combinations of one or more of the associated listed items.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The terms chip or computer chip, as used herein, generally refers to a hardware electronic component, and may refer to or include a small electronic circuit unit, also known as an integrated circuit (IC), or a combination of electronic circuits or ICs.

As used herein, the term microcontroller unit or its acronym MCU generally refers to a small computer on a single IC chip that can execute programs for controlling other devices or machines. A microcontroller unit contains one or more CPUs (processor cores) along with memory and programmable input/output (I/O) peripherals, and is usually designed for embedded applications.

The term interface, as used herein, generally refers to a communication tool or means at a point of interaction between components for performing wired or wireless data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The term code, as used herein, may include software, firmware, and/or microcode, and may refer to programs, routines, functions, classes, and/or objects. Some or all code from multiple modules may be executed using a single (shared) processor. In addition, some or all code from multiple modules may be stored by a single (shared) memory. Further, some or all code from a single module may be executed using a group of processors. Moreover, some or all code from a single module may be stored using a group of memories.

The apparatuses and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

The description below is merely illustrative in nature and is in no way intended to limit the invention, its application, or uses. The broad teachings of the invention can be implemented in a variety of forms. Therefore, while this invention includes particular examples, the true scope of the invention should not be so limited since other modifications will become apparent upon a study of the drawings, the specification, and the following claims. For purposes of clarity, the same reference numbers will be used in the drawings to identify similar elements. It should be understood that one or more steps within a method may be executed in different order (or concurrently) without altering the principles of the invention.

As discussed above, the GNSS can be of low quality in some cases when the signal is blocked by outer structures. For example, most on-board chips in the GNSS receiver provide their own PVT solutions with possibly more satellites and frequency bands. Thus, the PVT solutions could be better than what the consumer obtained from the raw GNSS data (with less observations).

Further, as discussed above, downstream modules provided on the GNSS receiver can theoretically use the covariance output of the localization engine to determine the quality of localization and take appropriate actions. However, the covariance matrix may not always reflect the true quality of the solution, as covariance is independent of several factors like consistency with different observations, which may fail to capture the underlying accuracy of localization.

In view of the deficiencies, certain aspects of the invention relate to an apparatus which provides a state machine based localization engine switchable between multiple states and local accuracy statuses, in order to control different behaviors of EKF based on the quality of raw GNSS observations and PVT solution given by on-board chip. Further, the localization engine may define a localization accuracy detector, which provides a semantic output to downstream modules, allowing the downstream module to make a more informed decision utilizing the localization output.

One aspect of the invention relates to an apparatus for performing positioning using a GNSS with a state machine based localization engine. FIG. 1 shows schematically an overall architecture of a GNSS according to one embodiment of the invention. As shown in FIG. 1, the GNSS 100 includes a GNSS receiver 110 and a plurality of satellites 120. Specifically, the GNSS receiver 110 may be an apparatus having a receiving device communicatively connected to the satellites 120, such that the GNSS receiver 110 may receive GNSS signals from the satellites 120. In certain embodiments, the GNSS receiver 110 may be an in-vehicle device installed or mounted in a vehicle, which may be a car, a motorcycle, a plane, a ship, a rover or other types of vehicles that require positioning or localization functions. Further, the GNSS receiver 110 also includes a computing device to process the GNSS signals received from the satellites 120 and to perform positioning or localization functions. In certain embodiment, the computing device may be an in-vehicle computer, such as the built-in electronic control unit (ECU) of the vehicle. Alternatively, in certain embodiments, the computing device may be an individual computing device or control unit of the GNSS receiver 110, which runs independently and separately from the existing ECU of the vehicle. In certain embodiments, the computing device may be a general purpose computer being provided with the necessary hardware and/or software components to perform positioning or localization functions, or may be a specialized computer or controller specifically designed and configured to perform positioning or localization functions.

Figure 2A:
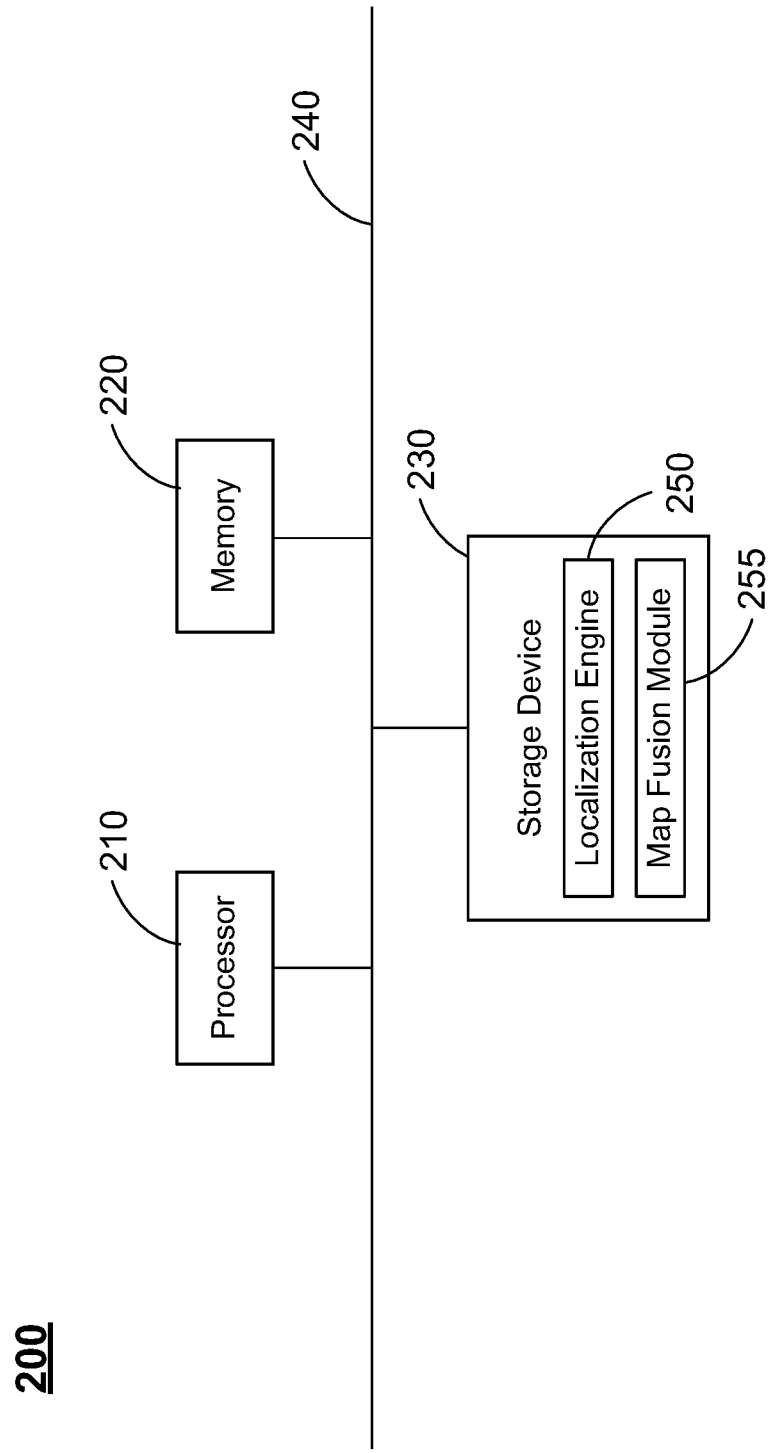
FIG. 2A shows schematically a computing device of the GNSS receiver according to one embodiment of the invention.

FIG. 2A shows schematically a computing device according to one embodiment of the invention. Specifically, the computing device 200 as shown in FIG. 2A is used as the computing device of the GNSS receiver 110 (i.e., the apparatus) as shown in FIG. 1. As shown in FIG. 2A, the computing device 200 includes a processor 210, a memory 220, and a storage device 230, and a bus 240 interconnecting the processor 210, the memory 220 and the storage device 230. In certain embodiments, the computing device 200 may include necessary hardware and/or software components (not shown) to perform its corresponding tasks. Examples of these hardware and/or software components may include, but not limited to, other required memory modules, interfaces, buses, Input/Output (I/O) modules and peripheral devices, and details thereof are not elaborated herein.

The processor 210 controls operation of the computing device 200, which may be used to execute any computer executable code or instructions. In certain embodiments, the processor 210 may be a central processing unit (CPU), and the computer executable code or instructions being executed by the processor 210 may include an operating system (OS) and other applications, codes or instructions stored in the computing device 200. In certain embodiments, the computing device 200 may run on multiple processors, which may include any suitable number of processors.

The memory 220 may be a volatile memory module, such as the random-access memory (RAM), for storing the data and information during the operation of the computing device 200. In certain embodiments, the memory 220 may be in the form of a volatile memory array. In certain embodiments, the computing device 200 may run on more than one memory 220.

The storage device 230 is a non-volatile storage media or device for storing the computer executable code or instructions, such as the OS and the software applications for the computing device 200. Examples of the storage device 230 may include flash memory, memory cards, USB drives, or other types of non-volatile storage devices such as hard drives, floppy disks, optical drives, or any other types of data storage devices. In certain embodiments, the computing device 200 may have more than one storage device 230, and the software applications of the computing device 200 may be stored in the more than one storage device 230 separately.

Figure 2B:
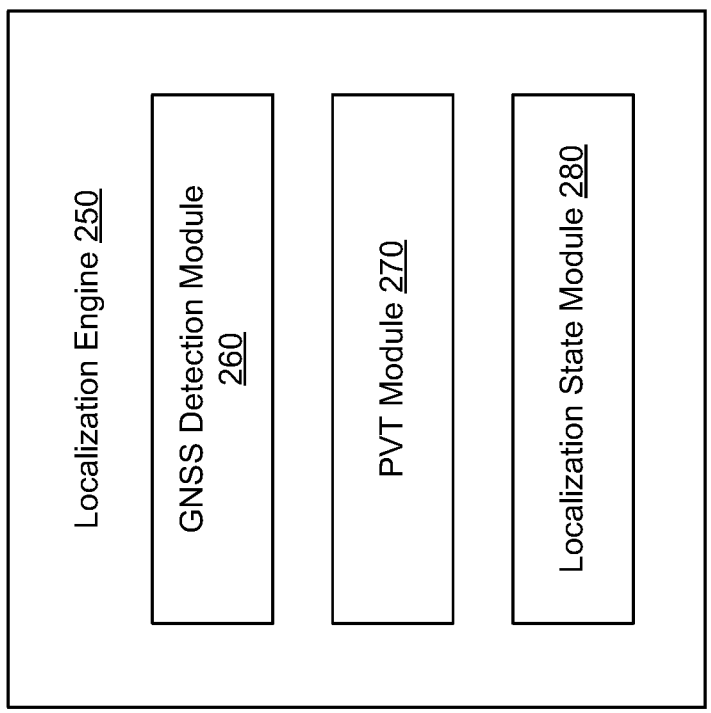
FIG. 2B shows schematically an outlier detection module in the computing device as shown in FIG. 2A according to one embodiment of the invention.

As shown in FIG. 2A, the computer executable code stored in the storage device 230 may include a localization engine 250 and a map fusion module 255. Specifically, the localization engine 250 is a generalized multi-mode state machine based localization engine which, when executed, provides the localization functions for performing the positioning. In certain embodiments, the localization engine 250 may be an EKF engine or other types of localization engines. FIG. 2B shows schematically a localization engine in the computing device as shown in FIG. 2A according to one embodiment of the invention. Specifically, the localization engine 250 as shown in FIG. 2B includes a GNSS detection module 260, a PVT module 270, and a localization state module 280. Further, although not explicitly shown in FIG. 2B, a database, which may be in the form of a table or other data collections, is provided to store and record the GNSS/PVT and/or other information required for the localization functions. For example, for each of the satellites in a GNSS, the status of the satellite may be detected as an outlier or an inlier, and the status as detected may be stored in the database.

The GNSS detection module 260 is used to process the GNSS signals received from the satellites in the GNSS, and to detect the status of each of the satellites in the GNSS. Specifically, the GNSS detection module 260 may determine a GNSS status, which is used to indicate the status of the GNSS observation (hereinafter the "ObsGNSS"), based on the status of each of the satellites in the GNSS. In certain embodiments, the GNSS detection module 260 may detect the status of each satellite in the GNSS as an outlier or an inlier, and then correspondingly determine the GNSS status based on the quantity of the inliers in the GNSS. In one embodiment, the GNSS detection module 260 may set a first threshold value for a valid ObsGNSS and a second threshold value for a good ObsGNSS. For example, the first threshold value may be set as 2, such that the GNSS status may indicate valid ObsGNSS when the quantity of the inliers in the GNSS is greater than or equal to 2; and the second threshold value may be set as 7, such that the GNSS status may indicate good ObsGNSS when the quantity of the inliers in the GNSS is greater than or equal to 7. On the other hand, when the quantity of the inliers in the GNSS is less than 2, the GNSS status may indicate that there is no valid or good ObsGNSS.

In the exemplary embodiment stated above, the GNSS detection module 260 determines the GNSS status based on the quantity of the inliers in the GNSS. However, the GNSS detection module 260 may detect each satellite in the GNSS as either an inlier or an outlier. Thus, in an alternative embodiment, it is also possible to determine the GNSS status based on the quantity of the outliers in the GNSS. The inlier/outlier detection may be performed using existing detection algorithms. For example, existing algorithms such as Doppler-pseudorange comparison, Random Sampling Consensus (RANSAC) check, history-based outlier rejection, or a combination thereof, may be used to perform GNSS outlier detection and/or rejection. Details of the inlier/outlier detection is not hereinafter elaborated.

The PVT module 270 is used to perform PVT observation for each of the satellites in the GNSS. Specifically, in the GNSS-Signal Processing Blocks (SDR) flow graph, the PVT block is the last one, and it acts as a signal sink, as the stream of data flowing along the GNSS receiver ends in the PVT block. In certain embodiments, the PVT module 270 may be in the form of the existing PVT solution on the on-board chip, or may be a modified software module that provides the PVT observation functions. Specifically, the PVT module 270 may determine a PVT status, which is used to indicate the status of the PVT observation (hereinafter the "ObsPVT"), based on the PVT accuracy values and other PVT related factors. In certain embodiments, for example, the horizontal accuracy value h_acc may be used to determine the PVT status by setting up a plurality of horizontal accuracy threshold values. In one embodiments, a first threshold value of 0.5 and a second threshold value of 0.2 may be preset, such that the PVT status indicates valid ObsPVT when h_acc<0.5 (i.e., the horizontal accuracy value h_acc is less than the first threshold value of 0.5), and indicates good ObsPVT when h_acc<0.2 (i.e., the horizontal accuracy value h_acc is less than the second threshold value of 0.2). On the other hand, when h_acc>0.5, the PVT module 270 may determine that there is no valid or good ObsPVT. In certain embodiments, the PVT status may be determined with other factors involved. For example, the PVT module 270 may determine that there is valid or good ObsPVT when the heading direction is accurate. Details of the PVT accuracy values and/or other factors being used may vary, and are thus not hereinafter elaborated.

The localization state module 280 is used to perform determination of the state of the localization engine 250 as well as the local accuracy status. Specifically, the localization state module 280 may generate the state of the localization state module 280 based on the GNSS status determined by the GNSS detection module 260 and the PVT status determined by the PVT module 270, and then determine the local accuracy status based on the state of the localization engine 280.

Figure 3:
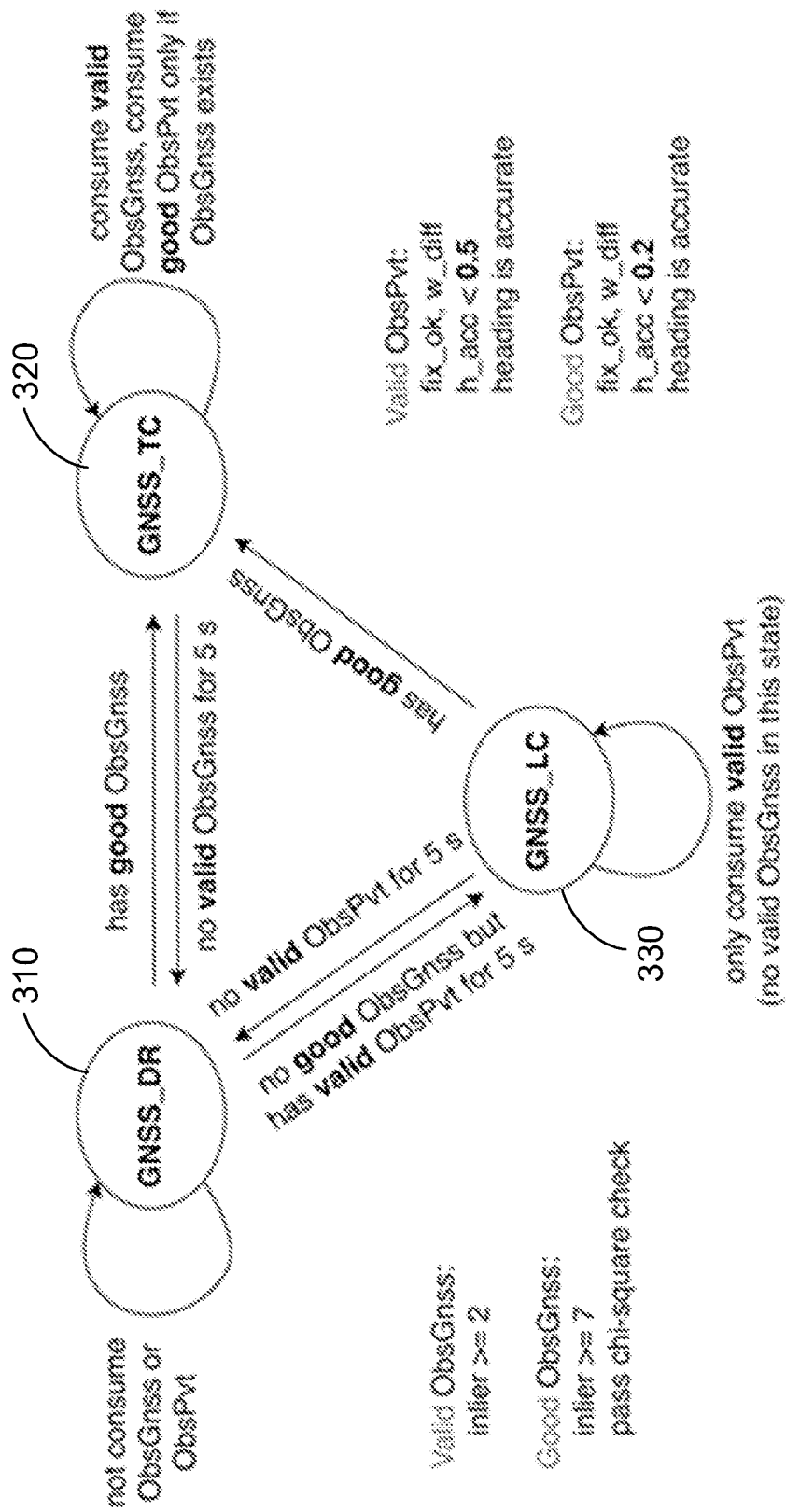
FIG. 3 shows schematically a state flow of a 3-state localization engine according to one embodiment of the invention, where the state of the localization engine is switchable between a dead reckoning state GNSS_DR, a tightly coupling state GNSS_TC, and a loosely coupling state GNSS_LC.

As discussed above, the localization engine is a state machine based localization engine, in which the state thereof is switchable between multiple predetermined states. Specifically, the state machine is used for the localization engine in order to handle situations for EKF resetting (e.g., when the vehicle enters or comes out of a tunnel). For example, FIG. 3 shows schematically a state flow of a 3-state localization engine according to one embodiment of the invention, where the state of the localization engine is switchable between a dead reckoning state GNSS_DR, a tightly coupling state GNSS_TC, and a loosely coupling state GNSS_LC. Specifically, the 3 states as shown in FIG. 3 are intuitively designed based on practical situations, which are elaborated as follows:

The dead reckoning (DR) state GNSS_DR 310: this is the state when EKF (i.e., the localization engine) does not consume GNSS/PVT observations and only use inertial navigation system (INS) propagation. In certain embodiment, the GNSS_DR state is the initial state.

The tightly coupling (TC) state GNSS_TC 320: in this state, EKF (i.e., the localization engine) will consume valid GNSS observation and good PVT observation.

The loosely coupling (LC) state GNSS_LC 330: in this state, EKF (i.e., the localization engine) consumes only PVT observation in a loosely coupling way, as there is no good GNSS observation.

As shown in FIG. 3, when the localization engine is in the DR state GNSS_DR, the localization engine does not consume ObsGNSS or ObsPVT. At this time, if there is no good ObsGNSS, but there is valid ObsPVT (e.g., h_acc<0.5) for a predetermined time period, e.g., 5 seconds, the localization engine is switched from the DR state GNSS_DR to the LC state GNSS_LC, such that the localization engine may consume the valid ObsPVT. On the other hand, if there is good ObsGNSS (e.g., quantity of inlier>=7), the localization engine is switched from the DR state GNSS_DR to the TC state GNSS_TC, such that the localization engine may consume the valid or good ObsGNSS.

Further, when the localization engine is in the LC state GNSS_LC, the localization engine only consumes the valid ObsPVT, as there is no valid ObsGNSS in this state. At this time, if there is no valid ObsPVT (e.g., h_acc>0.5) for the predetermined time period, e.g., 5 seconds, the localization engine is switched from the LC state GNSS_LC to the DR state GNSS_DR. On the other hand, if there is good ObsGNSS (e.g., quantity of inlier>=7), the localization engine is switched from the LC state GNSS_LC to the TC state GNSS_TC, such that the localization engine may consume the valid or good ObsGNSS.

Moreover, when the localization engine is in the TC state GNSS_TC, the localization engine may consumes the valid ObsGNSS, and may consume good ObsPVT only if the ObsGNSS exists. At this time, if there is no valid ObsGNSS (e.g., quantity of inlier<2) for the predetermined time period, e.g., 5 seconds, the localization engine is switched from the TC state GNSS_TC to the DR state GNSS_DR. It should be noted that there is no case that the localization engine is switched from the TC state GNSS_TC directly to the LC state GNSS_LC.

It should be noted that the conditions (i.e., the GNSS status and the PVT status) as shown in FIG. 3 for the localization engine to switch between the different states are provided as one exemplary embodiment, and are thus not intended to limit the scope of the invention.

Referring back to FIG. 2A, the map fusion module 255 is a downstream module of the apparatus that may perform corresponding downstream map fusion actions, such as tracking the apparatus in a preset map, based on the input of the localization engine 250. For example, as discussed above, the localization state module 280 is used to perform determination of the localization accuracy status. Specifically, the localization state module 280 may define a localization accuracy detector, which provides the localization accuracy status as a semantic output to a downstream module, such as the map fusion module 255 as shown in FIG. 2A, thus allowing the downstream map fusion module 255 to make a more informed decision utilizing the output of the localization engine 250.

Specifically, in certain embodiments, when the apparatus 100 is mounted on a vehicle, the map fusion module 255 may be used to control autonomous driving of the vehicle based on a map and the information provided by the localization engine 250. For example, in certain embodiments, level 3 driving requires the vehicle to be in a "Drive by Map" mode, in which the position of the vehicle with respect to a preset map is tracked. However, when the position of the vehicle cannot be tracked successfully in the map, the map fusion module 255 may downgrade to level 2 driving, which is in a "Drive by Perception" mode. Ideally, a user would want the vehicle to be in the level 3 self-driving mode as much as possible. Thus, the map fusion module 255 may utilize the output of the localization accuracy status by the localization state module 280 in order to control the switch between the level 2 and level 3 self-driving mode.

In certain embodiments, there are some assumptions about the localization function that the map fusion module 255 has to trigger an upgrade from the level 2 mode to the level 3 mode. For example, the map fusion module 255 would assume the localization to be lane level accurate. Thus, the localization engine 250 (or the localization state module 280 therein) has to indicate its estimated accuracy to the map fusion module 255. Accordingly, the localization accuracy status may be output in a Loc_Acc_St field to relay the information to the map fusion module 255 (or any other downstream module that may use this information to perform corresponding downstream actions).

Figure 4:
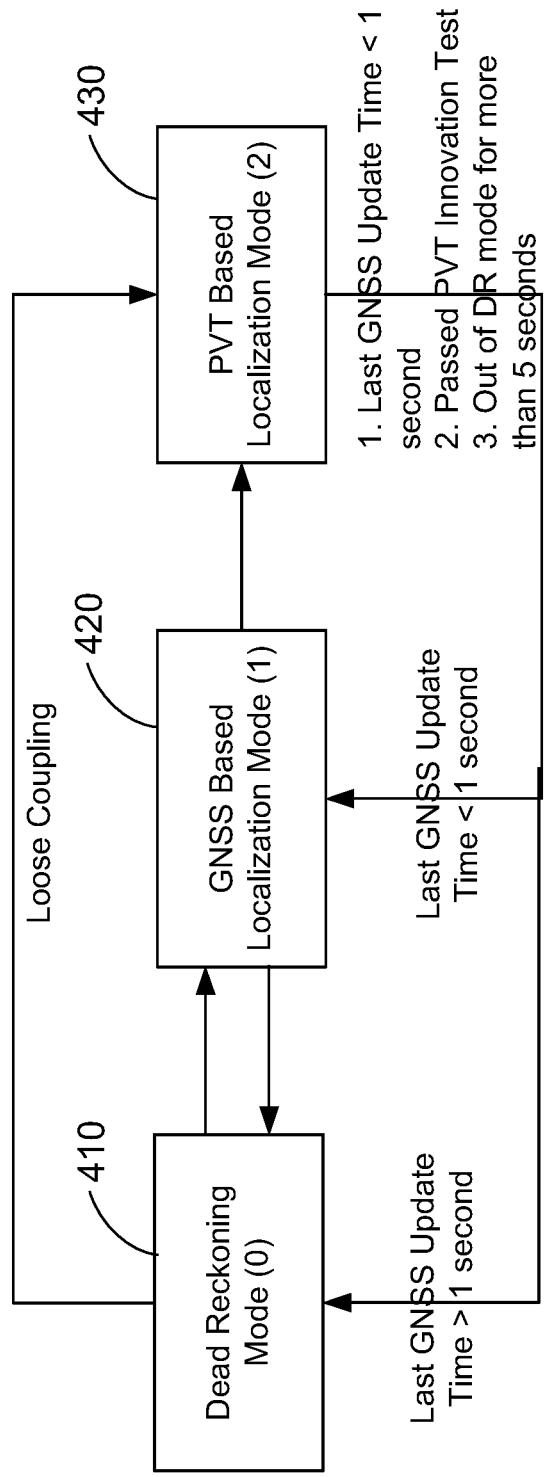
FIG. 4 shows schematically a status flow of the localization accuracy status according to one embodiment of the invention.

FIG. 4 shows schematically a status flow of the localization accuracy status according to one embodiment of the invention. Specifically, as shown in FIG. 4, the local accuracy status is switchable between 3 modes, including:

a dead reckoning (DR) mode (indicated by Loc_Acc_St=0);

a GNSS based localization mode (indicated by Loc_Acc_St=1); and a PVT based localization mode (indicated by Loc_Acc_St=2).

The DR mode (Loc_Acc_St=0) indicates that EKF (i.e., the localization engine) was not consuming ObsGNSS or ObsPVT. In other words, the DR mode corresponds to the DR state of the localization engine. In the DR mode, if the last GNSS update time is greater than 1 second (or any predetermined time threshold), the local accuracy status is switched to the DR mode. When the last GNSS update time becomes less than 1 second, the local accuracy status is switched to the GNSS based localization mode. On the other hand, when the last GNSS update time is less than 1 second and the state of the localization engine is in the LC state, the local accuracy status may be switched to the PVT based localization mode.

Further, the GNSS based localization mode (Loc_Acc_St=1) indicates that localization may be based on ObsGNSS. In other words, the GNSS based localization mode may correspond to the TC state of the localization engine. If the last GNSS update time is less than 1 second (or any predetermined time threshold), the local accuracy status is switched to the GNSS based localization mode. In the GNSS based localization mode, if the last GNSS update time becomes greater than 1 second, the local accuracy status may be switched back to the DR mode. On the other hand, if the local accuracy status is out of the DR mode for more than 5 seconds (or any other predetermined time threshold), the local accuracy status may be switched to the PVT based localization mode.

Moreover, the PVT based localization mode (Loc_Acc_St=2) indicates that localization may be based on ObsPVT. In other words, the GNSS based localization mode may correspond to the LC and/or TC states of the localization engine. If the last GNSS update time is less than 1 second (or any predetermined time threshold) and the state of the localization engine is in the LC state, the local accuracy status is switched to the PVT based localization mode. In addition, if the local accuracy status is in the GNSS based localization mode (and is thus out of the DR mode) for more than 5 seconds (or any other predetermined time threshold), the local accuracy status is also switched to the PVT based localization mode. In the PVT based localization mode, if the last GNSS update time becomes greater than 1 second, the local accuracy status may be switched back to the DR mode.

In certain embodiment, a PVT innovation test may be performed as a part of the condition for the PVT based localization mode. An example of the PVT innovation test may be performed as follows:

1) If the PVT is not consuming real-time kinematic (RTK), then the status is reported as a NO_RTK-PVT. The following formula shows the determination:

If ( hacc < h_acc_thershold || s_acc < s_Acc < threshold || !fix_ok || !diff_sol)
   pvt solution = NO_RTK_PVT
  2) If the EKF error with respect to the PVT innovation test is less than a threshold and the PVT accuracies are high, then the status is set as EKF_CONSISTENT, else the status is HIGH_PVT_ERROR. The following formula shows the determination:
If ( abs(ekf_pvt_error_cbf_lateral < PVT_RESIDUAL_MAX_ERR && h_err < MAX_HACC_SACC && s_err < MAX_HACC_SACC && fix_ok && diff_sol )
   pvt_solution = EKF CONSISTENT PVT
else
   pvt_solution = HIGH_PVT_ERROR (test failed)

When the PVT innovation test is performed as a part of the condition for the PVT based localization mode, the localization engine must pass the PVT innovation test (i.e., pvt_solution!=HIGH_PVT_ERROR) in order to stay in the PVT based localization mode. In other words, the condition for the PVT based localization mode may be summarized as: (1) the last GNSS update time is less than 1 second, the state of the localization engine is in the LC state, and the localization engine passes the PVT innovation test, or (2) the local accuracy status is in the GNSS based localization mode (and thus being out of the DR mode) for 5 second, and the localization engine passes a PVT innovation test.

In certain embodiments, the map fusion module 255 may use the local accuracy status (or the value of Loc_Acc_St) to assign an initial variance to localization, and trigger an upgrade from the level 2 mode to the level 3 mode.

In certain embodiments, the advantages of using the state machine based localization engine as described above include:

Using the state machine to control abnormal EKF behavior, such as position resetting when going out of tunnel.

By using the internal counter and the innovation test, the state machine will choose suitable action to make for DR, LC, and TC, making the localization engine more stable under multiple situations.

Better handling of situations and corner case when GNSS observations is of low quality with flexible design of state transition conditions.

It should be particularly emphasized that the localization accuracy status as shown in FIG. 4 does not necessarily one-to-one correspond with the state of the localization engine as shown in FIG. 3. For example, the localization engine could be in the TC state, but the localization accuracy status could be either in the GNSS based localization mode or in the PVT based localization mode.

Figure 5:
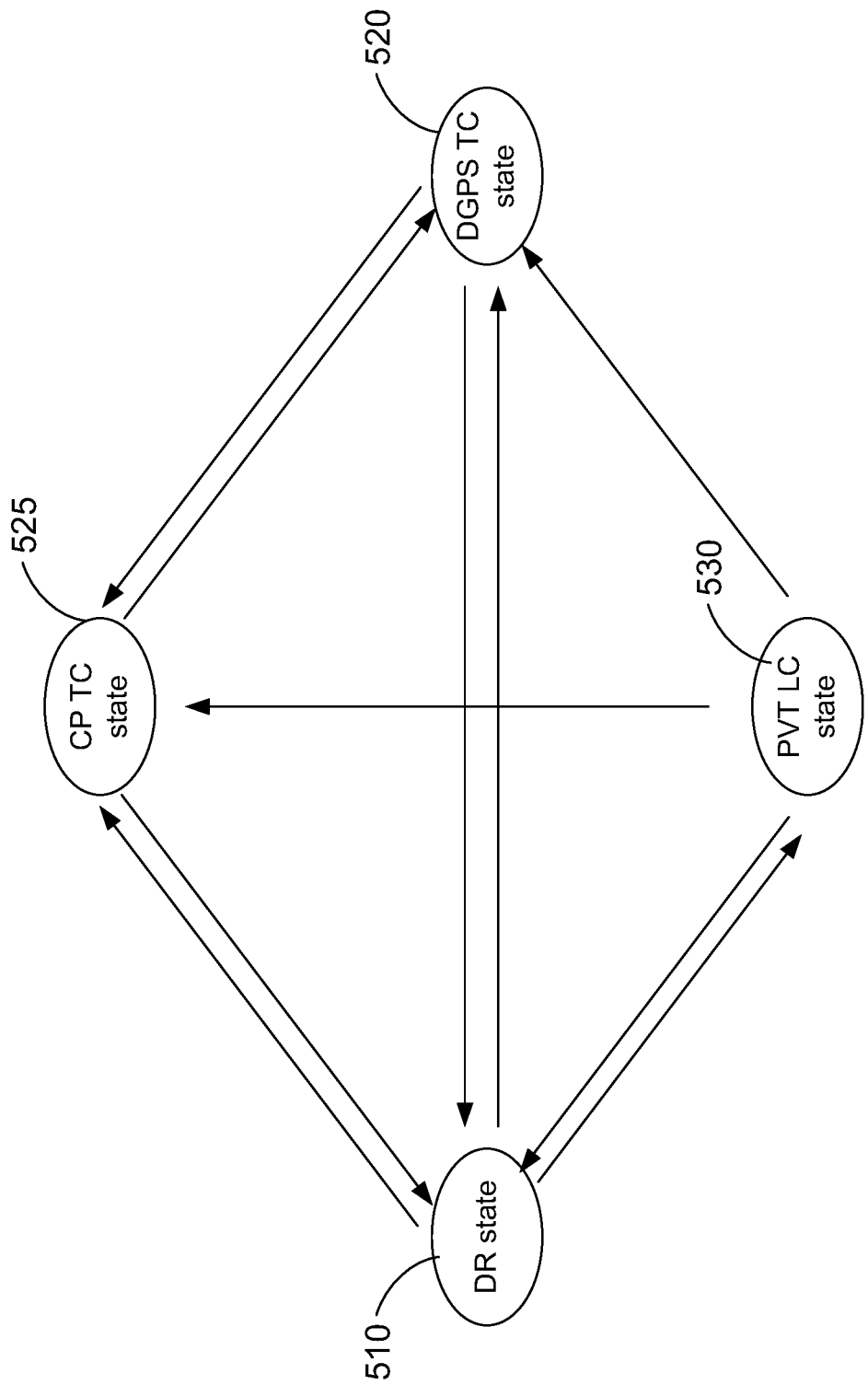
FIG. 5 shows schematically a state flow of a 4-state localization engine according to one embodiment of the invention, where the state of the localization engine is switchable between a dead reckoning state GNSS_DR, a differential GPS (DGPS) tightly coupling state DGPS-TC, a carrier phase (CP) tightly coupling state CP-TC, and a PVT loosely coupling state PVT-LC.

In the embodiment as shown in FIGS. 3 and 4, a 3-state localization engine is used. However, the localization engine may be a 4-state localization engine, in which the state thereof is switchable between 4 different states. For example, FIG. 5 shows schematically a state flow of a 4-state localization engine according to one embodiment of the invention, where the state of the localization engine is switchable between a dead reckoning state DR 510, a differential GPS (DGPS) tightly coupling state DGPS-TC 520, a carrier phase (CP) tightly coupling state CP-TC 525, and a PVT loosely coupling state PVT-LC 530. Specifically, the TC state 320 as shown in FIG. 3 is separated into two individual states, including the DGPS TC state DGPS-TC 520 and the CP TC state CP-TC 525. The conditions for switching between the states may be similar to those as shown in FIG. 3.

Another aspect of the invention relates to a method for performing positioning using a GNSS with a state machine based localization engine. For example, FIG. 6 shows a flowchart of a method for performing positioning using the GNSS with a state machine based localization engine according to one embodiment of the invention. In certain embodiments, the method as shown in FIG. 6 may be implemented on the GNSS receiver 110 (i.e., the apparatus) as shown in FIG. 1 and the computing device 200 as shown in FIGS. 2A and 2B. It should be particularly noted that, unless otherwise stated in the present disclosure, the steps of the method may be arranged in a different sequential order, and are thus not limited to the sequential order as shown in FIG. 6.

As shown in FIG. 6, at the process 610, the apparatus may provide a state machine based localization engine, such as the localization engine as shown in FIGS. 2A and 2B. At the process 620, the localization engine determines a state thereof based on the GNSS status and the PVT status. For example, when the localization engine is a 3-state localization engine, the state of the localization engine may be switchable between the DC state, the TC state and the LC state as shown in FIG. 3. Once the state of the localization engine is determined, at the process 630, the localization engine may determine a local accuracy status based on the state of the localization engine. An example of the local accuracy status may be referenced to in the status flow as shown in FIG. 4. Using the method, the local accuracy status may be generated as a semantic output by the localization engine, which is then passed to a downstream module, such as such as the map fusion module 255 as shown in FIG. 2A. At the process 640, the downstream module may perform a corresponding downstream action based on the local accuracy status. In this case, the downstream modules can appropriately take corresponding actions on the localization pose output depending on the state of the localization engine.

Yet another aspect of the invention provides a non-transitory tangible computer-readable medium storing instructions which, when executed by one or more processors of the GNSS receiver, cause the above disclosed method for performing positioning using a GNSS with a state machine based localization engine to be performed. The computer executable instructions or program codes enable the above disclosed GNSS receiver (i.e., the apparatus) or a similar system or apparatus to complete various operations in accordance with the above disclosed method. The storage medium/memory may include, but is not limited to, high-speed random access medium/memory such as DRAM, SRAM, DDR RAM or other random access solid state memory devices, and non-volatile memory such as one or more magnetic disk storage devices, optical disk storage devices, flash memory devices, or other non-volatile solid state storage devices.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the invention pertains without departing from its spirit and scope. Accordingly, the scope of the invention is defined by the appended claims rather than the foregoing description and the exemplary embodiments described therein.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

What is claimed is:

1. An apparatus for performing positioning using a Global Navigation Satellite System (GNSS) with a state machine based localization engine, the apparatus comprising:
   a receiving device communicatively connected to the GNSS, configured to receive GNSS signals from the GNSS; and
   a computing device having a processor and a storage device storing computer executable instructions, wherein the computer executable instructions, when executed on the processor, cause the processor to:
   provide the localization engine to process the GNSS signals;
   determine, based on a GNSS status and a position-velocity-time (PVT) status, a state of the localization engine, wherein the state of the localization engine is switchable between at least 3 states, and the at least 3 states include a dead reckoning state, a tightly coupling state, and a loosely coupling state;
   determine, by the localization engine, a local accuracy status based on the state of the localization engine; and
   perform, by a downstream module, a downstream action based on the local accuracy status, wherein the GNSS status indicates, based on a quantity of inliers in the GNSS, whether there is valid GNSS observation or good GNSS observation, and the GNSS status indicates valid GNSS observation when the quantity of the inliers in the GNSS is greater than or equal to 2, and indicates good GNSS observation when the quantity of the inliers in the GNSS is greater than or equal to 7; and wherein the PVT status indicates, based on PVT accuracy values, whether there is valid PVT observation or good PVT observation, and the PVT status indicates valid PVT observation when a horizontal accuracy value is less than 0.5, and indicates good PVT observation when the horizontal accuracy value is less than 0.2.

2. The apparatus of claim 1, wherein:

the localization engine is switched to the dead reckoning state in response to determine that there is no valid GNSS observation for a predetermined time period;

the localization engine is switched to the loosely coupling state in response to determine that there is good GNSS observation; and the localization engine is switched to the tightly coupling state in response to determine that there is valid PVT observation but no good GNSS observation for the predetermined time period.

3. The apparatus of claim 2, wherein the predetermined time period is 5 seconds.

4. The apparatus of claim 1, wherein the local accuracy status is switchable between a dead reckoning mode, a GNSS based localization mode and a PVT based localization mode.

5. The apparatus of claim 4, wherein:

the local accuracy status is switched to the dead reckoning mode when a last GNSS update time is greater than 1 second;

the local accuracy status is switched to the GNSS based localization mode when the last GNSS update time is less than 1 second; and the local accuracy status is switched to the PVT based localization mode when:

(1) the last GNSS update time is less than 1 second, the state of the localization engine is in the loosely coupling state, and the localization engine passes a PVT innovation test; or (2) the local accuracy status is in the GNSS based localization mode for 5 second, and the localization engine passes the PVT innovation test.

6. The apparatus of claim 1, wherein the downstream module is a map fusion module.

7. A vehicle having the apparatus of claim 1.

8. A method for performing positioning using a Global Navigation Satellite System (GNSS) with a state machine based localization engine, the method comprising:

receiving, by an apparatus communicatively connected to the GNSS, GNSS signals from the GNSS;

providing the localization engine on the apparatus to process the GNSS signals;

determining, based on a GNSS status and a position-velocity-time (PVT) status, a state of the localization engine, wherein the state of the localization engine is switchable between at least 3 states, and the at least 3 states include a dead reckoning state, a tightly coupling state, and a loosely coupling state;

determining, by the localization engine, a local accuracy status based on the state of the localization engine; and performing, by a downstream module executed on the apparatus, a downstream action based on the local accuracy status, wherein the GNSS status indicates, based on a quantity of inliers in the GNSS, whether there is valid GNSS observation or good GNSS observation, and the GNSS status indicates valid GNSS observation when the quantity of the inliers in the GNSS is greater than or equal to 2, and indicates good GNSS observation when the quantity of the inliers in the GNSS is greater than or equal to 7; and wherein the PVT status indicates, based on PVT accuracy values, whether there is valid PVT observation or good PVT observation, and the PVT status indicates valid PVT observation when a horizontal accuracy value is less than 0.5, and indicates good PVT observation when the horizontal accuracy value is less than 0.2.

9. The method of claim 8, wherein:

the localization engine is switched to the dead reckoning state in response to determine that there is no valid GNSS observation for a predetermined time period;

the localization engine is switched to the loosely coupling state in response to determine that there is good GNSS observation; and the localization engine is switched to the tightly coupling state in response to determine that there is valid PVT observation but no good GNSS observation for the predetermined time period.

10. The method of claim 9, wherein the predetermined time period is 5 seconds.

11. The method of claim 8, wherein:

the local accuracy status is switchable between a dead reckoning mode, a GNSS based localization mode and a PVT based localization mode;

the local accuracy status is switched to the dead reckoning mode when a last GNSS update time is greater than 1 second;

the local accuracy status is switched to the GNSS based localization mode when the last GNSS update time is less than 1 second; and the local accuracy status is switched to the PVT based localization mode when:

(1) the last GNSS update time is less than 1 second, the state of the localization engine is in the loosely coupling state, and the localization engine passes a PVT innovation test; or (2) the local accuracy status is in the GNSS based localization mode for 5 second, and the localization engine passes the PVT innovation test.

12. The method of claim 8, wherein the downstream module is a map fusion module.

13. A non-transitory tangible computer-readable medium storing computer executable instructions which, when executed by one or more processors, cause a method for performing positioning using a Global Navigation Satellite System (GNSS) with a state machine based localization engine to be performed, the method comprising:

receiving, by an apparatus communicatively connected to the GNSS, GNSS signals from the GNSS;

providing the localization engine on the apparatus to process the GNSS signals;

determining, based on a GNSS status and a position-velocity-time (PVT) status, a state of the localization engine, wherein the state of the localization engine is switchable between at least 3 states, and the at least 3 states include a dead reckoning state, a tightly coupling state, and a loosely coupling state;

determining, by the localization engine, a local accuracy status based on the state of the localization engine; and performing, by a downstream module executed on the apparatus, a downstream action based on the local accuracy status, wherein the GNSS status indicates, based on a quantity of inliers in the GNSS, whether there is valid GNSS observation or good GNSS observation, and the GNSS status indicates valid GNSS observation when the quantity of the inliers in the GNSS is greater than or equal to 2, and indicates good GNSS observation when the quantity of the inliers in the GNSS is greater than or equal to 7; and wherein the PVT status indicates, based on PVT accuracy values, whether there is valid PVT observation or good PVT observation, and the PVT status indicates valid PVT observation when a horizontal accuracy value is less than 0.5, and indicates good PVT observation when the horizontal accuracy value is less than 0.2.

14. The non-transitory tangible computer-readable medium of claim 13, wherein:

the localization engine is switched to the dead reckoning state in response to determine that there is no valid GNSS observation for a predetermined time period;

the localization engine is switched to the loosely coupling state in response to determine that there is good GNSS observation; and the localization engine is switched to the tightly coupling state in response to determine that there is valid PVT observation but no good GNSS observation for the predetermined time period.

15. The non-transitory tangible computer-readable medium of claim 14, wherein the predetermined time period is 5 seconds.

16. The non-transitory tangible computer-readable medium of claim 13, wherein:

the local accuracy status is switchable between a dead reckoning mode, a GNSS based localization mode and a PVT based localization mode;

the local accuracy status is switched to the dead reckoning mode when a last GNSS update time is greater than 1 second;

the local accuracy status is switched to the GNSS based localization mode when the last GNSS update time is less than 1 second; and the local accuracy status is switched to the PVT based localization mode when:
 (1) the last GNSS update time is less than 1 second, the state of the localization engine is in the loosely coupling state, and the localization engine passes a PVT innovation test; or
 (2) the local accuracy status is in the GNSS based localization mode for 5 second, and the localization engine passes the PVT innovation test.

17. The non-transitory tangible computer-readable medium of claim 13, wherein the downstream module is a map fusion module.

* * * * *